United States Patent Office 3,435,918
Patented Apr. 1, 1969

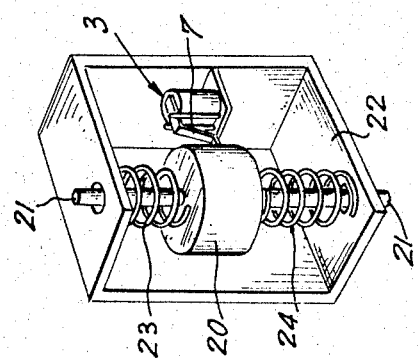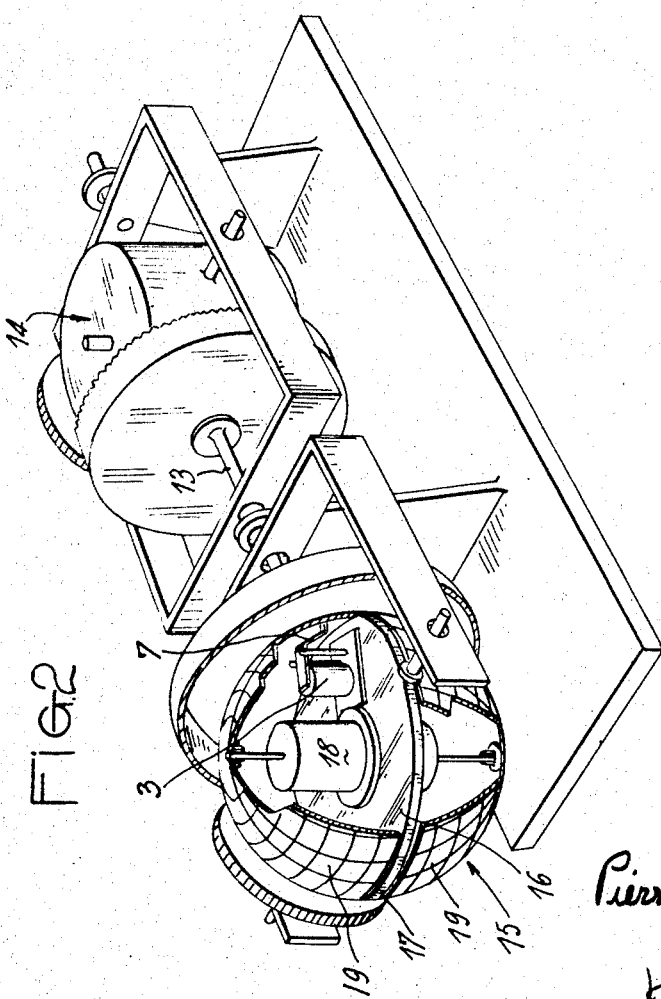

3,435,918
DEVICE FOR INCREASING SENSITIVITY DAMPING
Pierre André Chombard, Boulogne, France, assignor to Societe Francaise d'Equipements pour la Navigation Aerienne, Neuilly-sur-Seine, Hauts-de-Seine, France, a joint-stock company of France
Filed Mar. 27, 1967, Ser. No. 626,112
Claims priority, application France, Mar. 29, 1966, 55,517
Int. Cl. F16d 63/00
U.S. Cl. 188—1                                           9 Claims

ABSTRACT OF THE DISCLOSURE

A device for improving sensitivity and damping, adaptable to an indicating instrument provided with a moving member, characterized in that a striker coupled to a fixed portion and actuated periodically by an appropriate means, is provided so as to strike the said moving member, the striker being spaced apart from said moving member when the striker is in the position of rest, whereby the mechanical shocks produced by the striker effectively reduce the contact forces of the moving member and at the same time cause damping of the said member by creating as many transitory frictions as there are shocks applied.

---

The present invention relates to a device for increasing sensitivity and damping, and more particularly a sensitivity and damping device permitting the display member to follow the controlled position without delay or displacement, in spite of the friction and inertia of the moving parts.

Local or remote measuring instruments often comprise moving elements without mechanical connection with the order-giving station, the positions of the said moving elements giving an indication of the measurement which enables the working of the apparatus to be followed.

For example, measuring instruments frequently comprise a needle mounted on a rotating shaft which moves with respect to a fixed dial carrying a graduation. Thus, a gyrometer rotates about its suspension axis under the effect of the angular speed which it is intended to measure. There also exist remote indications effected by means of the transmission of the angular position of a shaft by devices known as autosyn, selsyn or synchronous machines (transmitter and receiver). The most generally used of the devices which have been cited above comprise rotating shafts, but it is not excluded that the movements imposed are rectilinear.

In order to apply the invention to linear transmission members which move by translation, it is only necessary, as will be brought out in the description which follows below, to replace the word torque by the word force, and movement of rotation by movement of translation.

In order-repeating devices or remote-measurement indicators of the prior art, and in certain measuring instruments, the driving torque which acts on the shaft in response to the impulse is generally very small, and in any case tends towards zero at the correct angular position of the said shaft. This position cannot be obtained precisely because of the friction torques which arise in the suspension bearings, and which in consequence result in a position error, that is to say in a certain inaccuracy.

On the other hand, if the moment of inertia of the rotating portion is relatively high with respect to the driving torque, delays are introduced into the rapid movements and oscillations arise about the positions of equilibrium. The damping of the oscillations can be carried out by the introduction of solid or viscous friction torques which are more or less regulatable. Solid friction increases inaccuracy. Viscous friction by liquid is frequently difficult to apply and may even be incompatible with the design or use of the instrument. Viscous torques utilizing eddy currents necessitate high relative speeds and therefore often require stepup gearing which increases the friction torques and in consequence further aggravates the inaccuracy.

For these reasons, the order and remote-control repeaters of this type have been generally limited up to the present time to needles, which practically prevented their use when it was necessary to control parts having a certain inertia, for example in automatically operating installations, in which it was necessary to utilize a more complicated followup device, by electric servomotor for example.

The object of the present invention is a simple device which has the function, in apparatus of the type considered:

Of improving the accuracy of indication by reducing the friction torques;

Of introducing suitable damping, which does not brake the moving member and therefore does not adversely affect the accuracy.

The device consists essentially of a small electric striker which periodically strikes the moving member of the measuring instrument or of the repeater, which permits:

High precision to be obtained in the response finally indicated by the receiving member at the moment when equilibrium is reached;

Rapid damping of the oscillations, which retard the moment of establishment of equilibrium and can result in perturbation and reaction in jerks if there is utilized a reactive chain of several receivers controlled in dependence on each other;

Reduction of the friction of the moving parts to the maximum extent, if necessary to the detriment of their lightness;

Increase of their inertia, without adversely affecting the properties of accuracy and rapidity of setting to the equilibrium position;

Periodic action by shocks;

And in consequency the control, not only of needles, but of parts of greater weight.

Other characteristic features and advantages will become apparent from the description which follows below, made with reference to the accompanying drawings and giving by way of indication but not in any limitative sense, a number of forms of embodiment of the invention.

In the drawings:

FIG. 2 is a perspective view of one possible application of the invention to a sphere-type gyroscopic horizon;

FIG. 3 is a perspective view of another possible application of the invention to an accelerometer;

Figure 1:
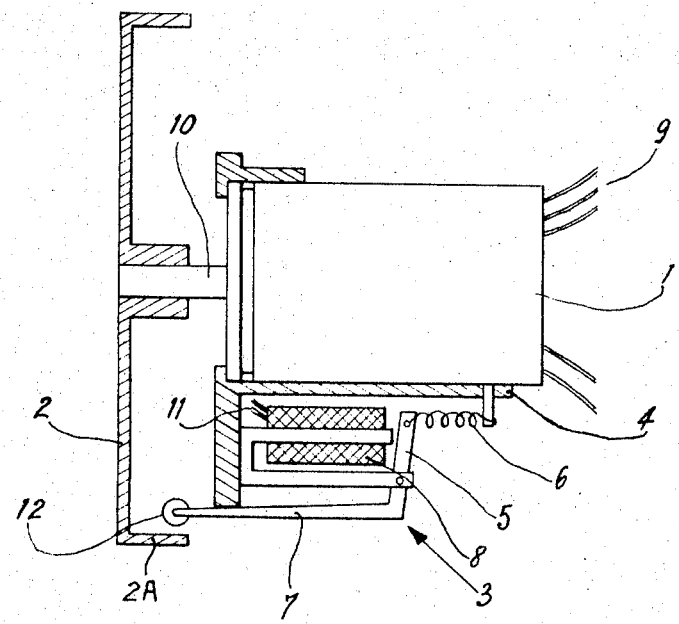
FIG. 1 is a view in section to a large scale of a striker according to the invention.

In FIG. 1 there is seen a selsyn receiving device 1 supplied by wires 9. These wires 9 ensure the connection between the receiver and a remote measurement or control transmitter (not shown), the movements of which are intended to control the movements of the shaft 10 of the moving member of the receiver 1.

On the shaft 10 is mounted a disc 2 provided with a rim 2A, the mass and the moment of inertia of which can be much greater than the mass and the moment of inertia of the light needle which up to now has generally been mounted on repeaters of this kind.

According to the invention, a striker 3 is hinged on the frame 4 of the apparatus. Its armature 5, restored by the spring 6, carries a rod 7, the extremity of which comes into contact with the rim 2A of the disc 2, the direction of the shock passing through the axis of the disc 2. The coil 8 of the striker is supplied with alternating current through the conductors 11. However, the arrangement of the striker may be of the conventional type consisting of a bell mounting supplied with direct current. The extremity 12 of the rod or blade 7 may advantageously be made of rubber or plastic material.

At each impact of the portion 12 against the rim 2A coupled to the rotating shaft 10, there is introduced a transitory solid friction which absorbs part of the kinetic energy of rotation of the rotating system, that is to say it produces a damping effect. Between two impacts, the rotating system 2 can turn freely and in consequence can reach its position of equilibrium. There is thus obtained a damping effect by solid friction which eliminates the above-mentioned drawback of this form of damping, namely its adverse effect on accuracy.

On the other hand, each small shock causes a reduction in the contact forces in the bearings, and therefore of the friction torques, which improves the accuracy.

One particular application of a device for improving sensitivity and damping according to the invention is embodied in a course-repeating sphere-type gyroscopic horizon which is shown diagrammatically in FIG. 2.

In this gyroscopic horizon, the coupling 13 between the gyroscope 14 which gives the vertical and the devices which give the pilot indications 15 utilized for piloting, is in accordance with that described in United States Patent No. 3,039,200 of June 19, 1962. However, the indicating cylinder described in this patent is replaced in this case by a circular platform 16, the visible edge 17 of which constitutes the horizon line as seen by the pilot. At the centre of this platform is fixed a remote display synchro-device 18, the rotor shaft of which is perpendicular to the plane of the platform and extends on each side. At the two extremities of this shaft are fixed two hemispheres 19, the edges of which are adjacent to the edges of the platform, so that the external aspect is that of a complete sphere. The synchro-device 18 is electrically connected to a synchro-course transmitter for the aircraft mounted in a distant course-setting station (not shown). The sphere is thus stabilized about its three axes. It is provided with a network of meridians and parallels which enables the pilot to read against a fixed reference mark (not shown) the angles of rolling, pitching and yawing. This spherical representation is described in French Patent No. 1,141,851 of January 15, 1952.

In the form of embodiment described here, a servo-control of the course or bearing with amplifier and electric servo-motor is not suitable, because:

Of its bulk which is not compatible with the small dimensions of the sphere of an instrument designed in a standard small size;

Of its weight, which would constitute an excessive load liable to cause errors in the vertical gyroscope, which acts by its gyroscopic inertia alone;

Of the necessity of introducing a fairly large number of current input points passing through rotating contacts on the suspension axes of the gyroscope and creating parasitic disturbing torques.

The utilization of a single remote-display synchro-device eliminates or considerably reduces these disadvantages. On the other hand, it has a very low driving torque which adversely affects the accuracy of the course indications, and the damping is completely insufficient because of the relatively large inertia of the two hemispheres.

The introduction of a striker 3 according to the invention, arranged as indicated in FIG. 2, enables these disadvantages to be overcome and ensures correct operation of the course repetition. The striker 3 is fixed on the circular platform 16, and the extremity of the rod 7 strikes the inner surface of one of the hemispheres. Its electrical supply, taken in parallel with that of the synchro-rotor 18, does not require any special current input.

Another possible application of the invention, given by way of example, is shown diagrammatically in FIG. 3. In this case, the application is to an accelerometer, the weight-head or sensitive weight 20 of which is guided by rods 21 passing into holes in the support 22, and moves with a rectilinear movement, being returned to its position of equilibrium by two springs 23 and 24. In the absence of damping, the sensitive weight 20 oscillates and the measurement of the acceleration given by the position of this weight by means of devices (not shown) can only be utilized with difficulty. The small striker 3 hinged on the frame of the instrument acts on the sensitive weight 20 (or on any other part fixed to this sensitive weight) by the extremity of the rod 7 in order to provide suitable damping while at the same time reducing the friction of the guides, thus improving the sensitivity following the process already described.

Figure 4:
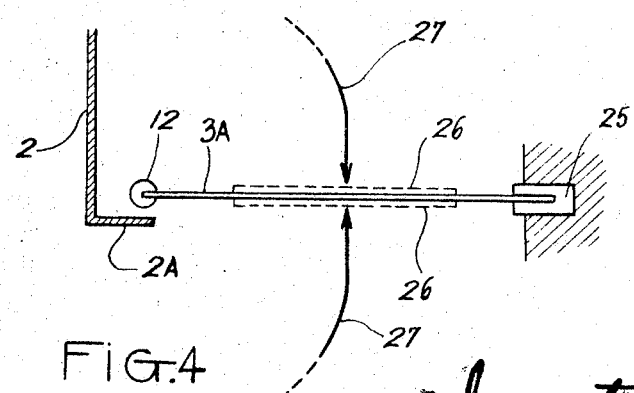
FIG. 4 is an alternative form of the invention.

According to an alternative form shown in FIG. 4, the striker 3A is constituted by a single metal blade held by one of its extremities at a fixed point 25 and covered on its two faces with a substance 26 having piezoelectric properties. A composite blade of this kind, when excited on both its faces by an alternating voltage 27, is forced into oscillating movements of the same frequency as the exciting voltage.

It will of course be understood that the present invention has been described above purely by way of explanation and not in any limitative sense and that any modification of detail may be made thereto, in accordance with its spirit, without thereby departing from its scope.

I claim:
1. A device for improving sensitivity and damping, adaptable to an indicating instrument provided with a moving member, said device comprising:
    a fixed portion;
    a striker means attached to said fixed portion for absorbing energy by impact from said moving member substantially equal to the dampening effect for the purpose of increasing accuracy of the indicating instrument;
    a space between said striker means and said moving member when the striker means is in its position of rest;
    means for periodically actuating the striker to strike against said moving member;
    whereby the mechanical shocks created by said striker means reduce the contact forces of said moving member and at the same time effect the damping of said member by creating as many transitory frictions as there are shocks applied.
2. A device for improving sensitivity and damping as claimed in claim 1, in which the direction of movement of the striker means passes through the axis of symmetry of said moving member.
3. A device for improving sensitivity and damping as claimed in claim 1, in which said means for periodically actuating said striker means is an electromagnet.
4. A device for improving sensitivity and damping as claimed in claim 1, in which said means for periodically actuating said striker means is a composite balde covered on its two faces with a substance having piezoelectric properties and excited on its two faces by an alternating voltage.
5. A device for improving sensitivity and damping as claimed in claim 1, in which said moving member is mounted on a rotating shaft.
6. A device for improving sensitivity and damping as claimed in claim 5, in which said moving member is provided with a flat striking surface perpendicular to the rotating shaft.
7. A device for improving sensitivity and damping as claimed in claim 5, in which said moving member is provided with a flat striking surface parallel to the rotating shaft.

8. A device for improving sensitivity and damping as claimed in claim 5, in which said moving member is a course-repeating sphere and said striker means is arranged in the interior of said sphere.

9. A device for improving sensitivity and damping as claimed in claim 1, in which said moving member is displaced with a rectilinear movement.

References Cited

UNITED STATES PATENTS

| | | | |
|---|---|---|---|
| 2,838,137 | 6/1958 | Wallerstein | 188—1 |
| 3,362,504 | 1/1968 | Maldarelli | 188—1 |

DUANE A. REGER, *Primary Examiner.*